United States Patent [19]

Bish et al.

[11] Patent Number: 4,683,180
[45] Date of Patent: Jul. 28, 1987

[54] ELECTRIC STORAGE BATTERY

[75] Inventors: James R. Bish, Anderson; Charles P. McCartney, Jr., Yorktown; Clarence A. Meadows, Muncie, all of Ind.

[73] Assignee: General Motors Corporation, Detroit, Mich.

[21] Appl. No.: 859,364

[22] Filed: May 5, 1986

[51] Int. Cl.$^4$ ............................................. H01M 2/28
[52] U.S. Cl. .................................... 429/130; 429/160; 429/161; 429/211
[58] Field of Search .............. 429/161, 160, 211, 130, 429/146

[56] References Cited

U.S. PATENT DOCUMENTS

| | | | |
|---|---|---|---|
| 2,287,802 | 6/1942 | Hill | 29/623.1 |
| 2,702,829 | 2/1955 | Chapel | 429/161 |
| 3,350,237 | 10/1967 | Sealey | 29/623.4 |
| 3,396,056 | 8/1968 | Gonnard | 429/160 |
| 3,841,915 | 10/1974 | Eberle | 429/160 |
| 3,963,521 | 6/1976 | Jache | 429/160 |
| 3,988,169 | 10/1976 | McLean | 29/623.1 |

Primary Examiner—Anthony Skapars
Attorney, Agent, or Firm—Lawrence B. Plant

[57] ABSTRACT

Electrode plate for an electric storage battery including a lug for electrically coupling the plate to other plates in the battery and an insulating collar tightly engaging the root of each plate lug. In a stack of plates, the several collars abut one another so as to separate the lugs from each other and may serve to form a mold for shaping a plate strap cast thereon.

12 Claims, 10 Drawing Figures

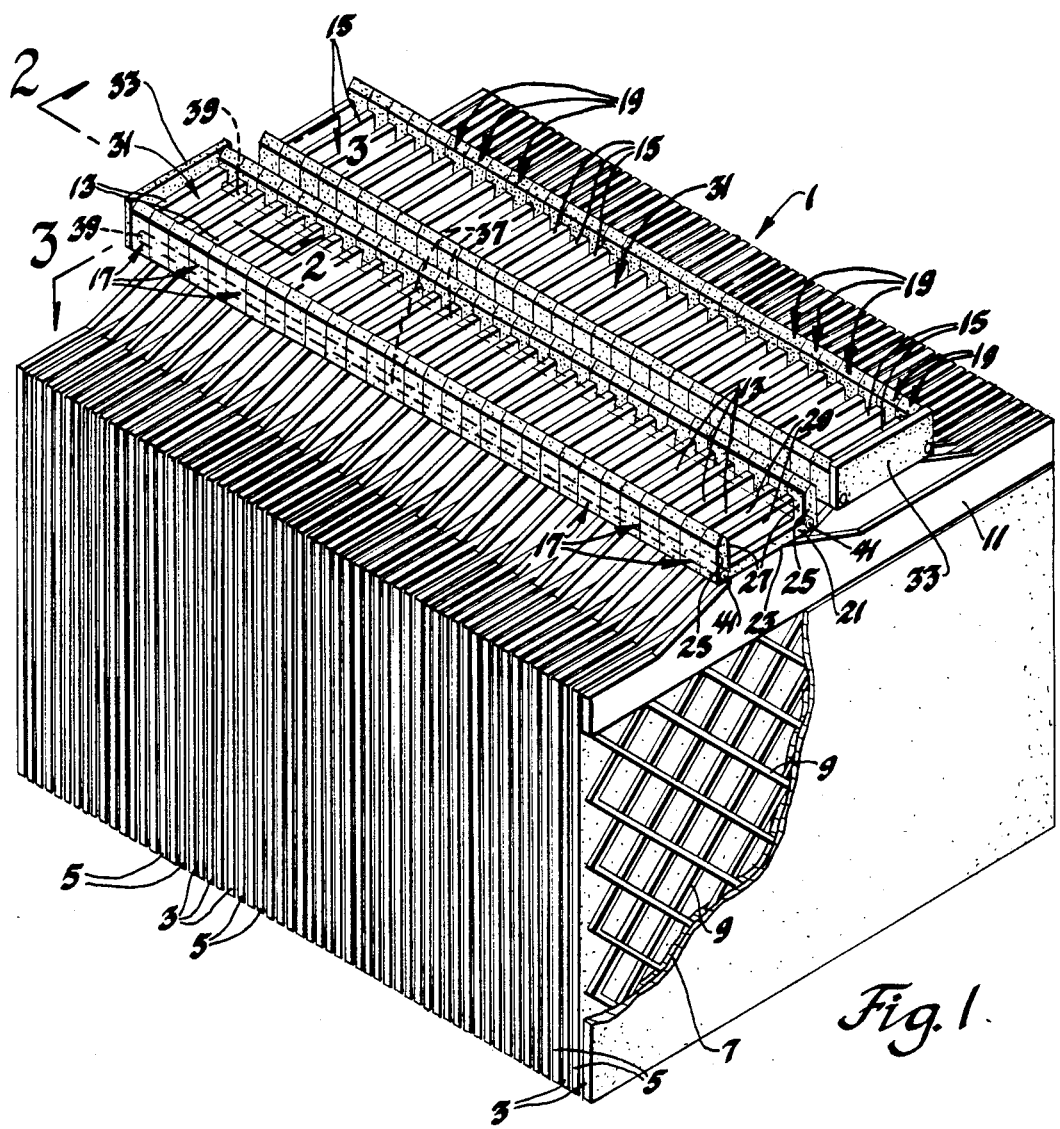
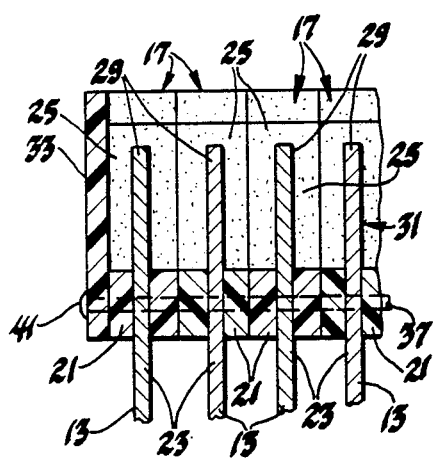
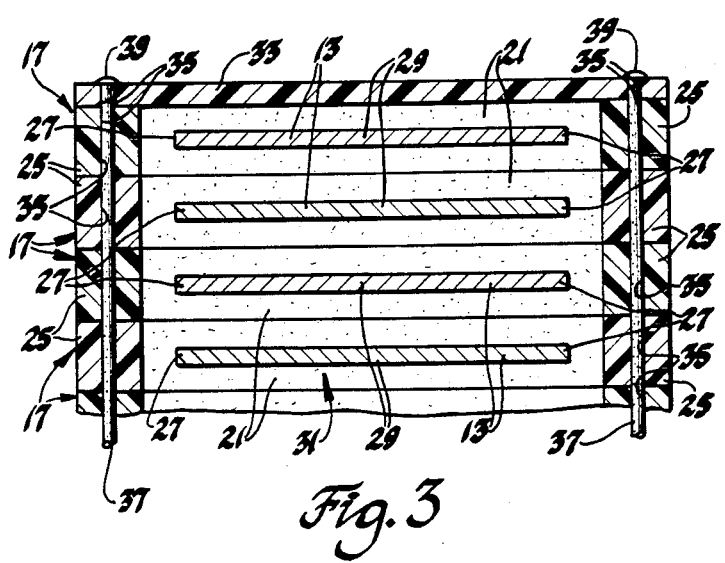

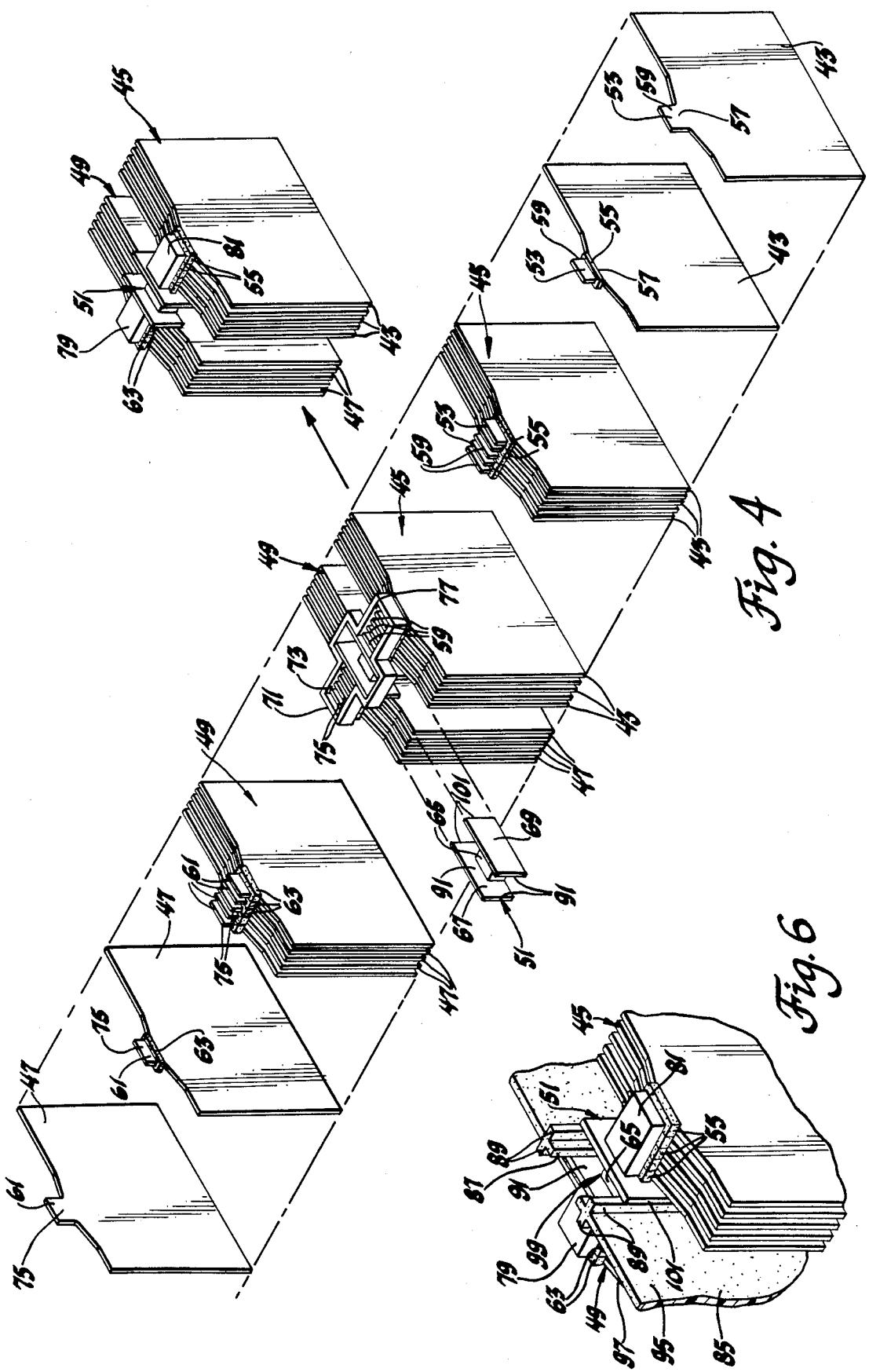

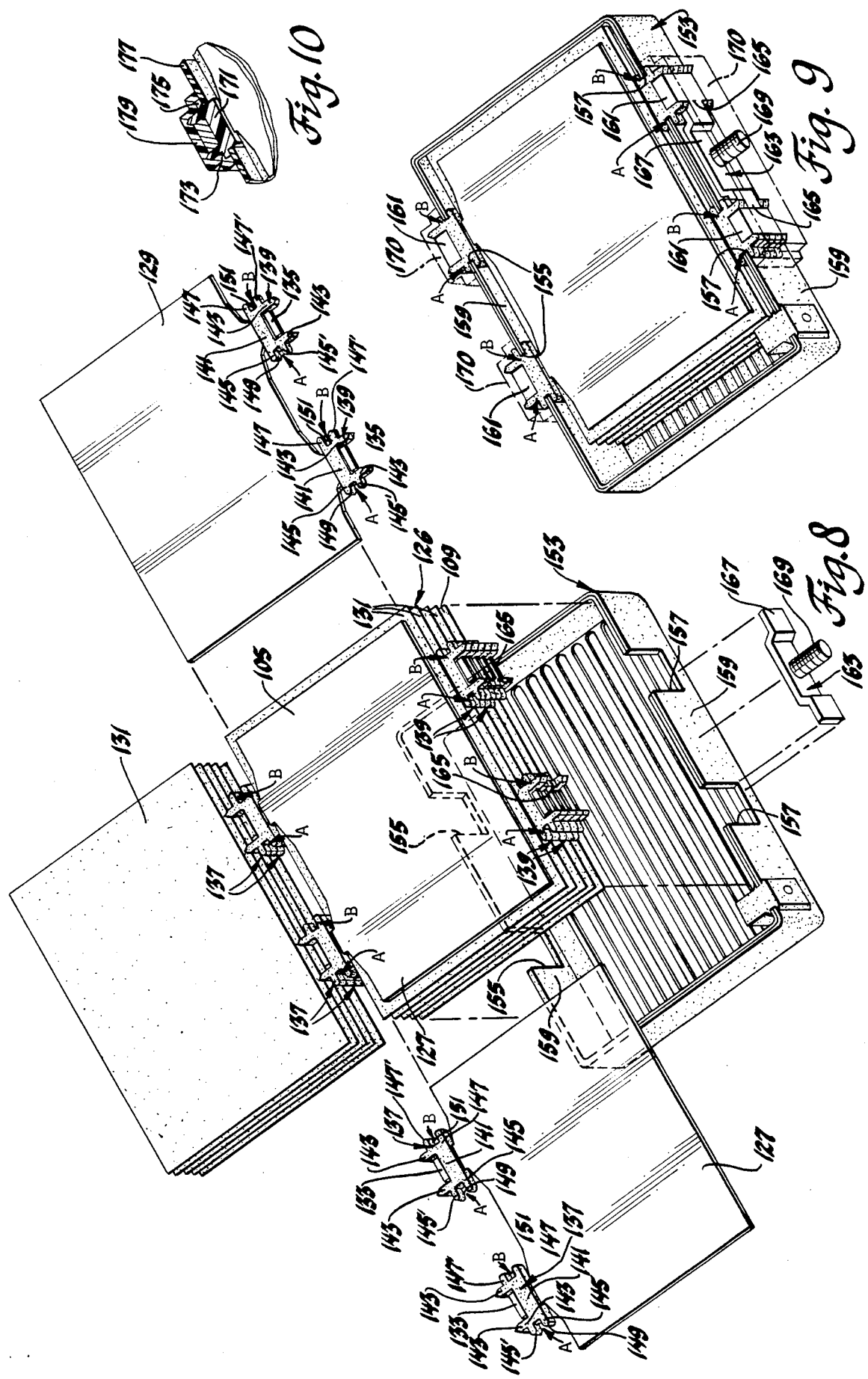

ELECTRIC STORAGE BATTERY

This invention relates to plates (i.e., electrodes) and cell elements for electric storage batteries.

BACKGROUND OF THE INVENTION

Electric storage batteries (e.g., lead-acid, Ni-Zn, etc.) comprise several galvanic cell elements each immersed in an electrolyte and encased in separate compartments of a substantially leak-proof container. Each cell element comprises at least one plate-like, positive electrode (i.e., a positive plate), one plate-like negative electrode (i.e., negative plate) and a porous separator (e.g., a thin microporous sheet and/or absorbent glass mat) therebetween. Multi-plate cell elements are commonplace and comprise a stack of alternating positive and negative polarity plates interleaved one with the other and the separators. The plates themselves each comprise a conductive substrate which supports an electrochemically active material thereon and conducts electrical current substantially uniformly therethrough. In Pb-acid batteries, for example, the plates comprise a leady active material (i.e., $PbO_2$ for the positive plates and Pb for the negative plates) pasted onto a reticulated Pb-alloy grid substrate. A lug projects from the substrate/grid of each plate and serves to electrically couple the plate to other electrical components (e.g., terminals, other plates, etc.) of the battery. One such coupling occurs between aligned lugs of like polarity plates within a multi-plate cell element and thence, via an intercell connector, to opposite polarity plates in adjacent cells. In some instances, the lugs are coupled by simply bundling and welding the plates lugs together through an aperture in an intercell partition of the container such as shown in FIG. 5 of U.S. Pat. No. 4,046,062 to matter. More typically, however, the several plate lugs are electrically coupled one to the other by a bus bar, known as a plate strap, which is burned to, or cast about, the plate lugs: (1) inside the battery container such as disclosed in FIG. 2 of the aforesaid U.S. Pat. No. 4,046,0672; or (2) outside the battery container such, for example, as disclosed in Eberle U.S. Pat. No. 3,841,915 where the plate strap is formed in the container's cover.

It has been proposed to position preformed strips of insulating material over the lugs of each set of aligned positive or negative plate lugs (e.g., see U.S. Pat. No. 2,287,802) to facilitate manufacturing, to rigidify the stack, and/or to prevent accidental internal short circuiting of the cell. Likewise, it has been proposed to fit a preformed trough over the plate lugs to form a mold for forming a cast-in-place plate strap onto the plate lugs and through the intercell partition (e.g., see U.S. Pat. No. 3,988,169). Finally, our own copending U.S. Pat. application Ser. No. 783,359 filed Oct. 3, 1985 entitled "Electric Storage Battery", which is incorporated herein by reference, discloses pressure molding a strip of plastic in and about the roots of aligned plate lugs to tightly engage the lugs and to firmly hold them in precise alignment with, and spaced from, each other. This latter approach to providing a plastic strip on the roots of the lugs requires stocking a variety of different molds in order to accommodate cell elements having different numbers and thicknesses of plates.

There exists a need for an even better way for providing a strip of insulating material about the plate lugs of a cell element. Moreover, there exists a need for a way to provide a leak-tight seal between the plate lug(s) and an external wall of the battery container.

Accordingly, it is an object of the present invention to facilitate battery assembly by providing the lug(s) of each battery plate with its own individual, tight-fitting, insulating collar which mates: with similar collars on other lugs to form a segmented insulating strip at the roots thereof; with similar collars on other lugs to form a mold for forming a plate strap about the plate lugs; and/or with an aperture in a container wall to facilitate the formation of a substantially liquid-tight seal therewith. It is a more specific object of the present invention to provide a galvanic cell element having a segmented strip of insulating material about its plate lugs, which strip comprises a plurality of discrete lug collars in aligned abutting relation one to the other. These and other objects and advantages of the present invention will become more readily apparent from the detailed description thereof which follows.

BRIEF DESCRIPTION OF THE INVENTION

The present invention comprehends a battery plate having: a conductive substrate supporting an electrochemically active material; a lug projecting from the substrate to electrically couple the plate to other electrical component(s) (e.g., plates, terminals, etc.) of the battery; and a discrete, insulating collar formed tightly about the root (i.e., proximate the substrate) of each lug, which collar is adapted to engage collars on other lugs, and/or an aperture in the battery's container wall forming a substantially liquid-tight seal therewith or otherwise to facilitate various battery assembly operations.

According to a preferred embodiment of the invention, a battery cell element is formed from a plurality of lug-bearing, positive and negative polarity plates alternately interleaved with one another wherein each plate lug has a discrete insulating (e.g., thermoplastic or thermosetting resin) collar formed about the root thereof (i.e., near the plate's active material). The collar on each lug is aligned in abutting relation to other collars on other lugs of like polarity plates in the element and together therewith serve (1) to space the several lugs apart, (2) to insulate the lug's electrical connector from plates of opposite polarity, and (3) in some instances to form a mold for forming a plate strap, in situ, about the plate lugs. The distal end (i.e., remote from the active material) of each lug engages an electrical connector (e.g., plate strap) which electrically couples the several plate lugs together. Each collar will most preferably have a U-shaped configuration, the legs of which extend up along the edges of the distal portion of its associated lug and, when aligned and abutted to other collars, forms a trough for shaping a plate strap molded therein.

In accordance with another aspect of the present invention, the several collars may be tied together by means of a thread, or the like, extending the length of the aligned collars through apertures formed therein. The thread will be bonded (e.g., welded) at its ends to the end collars in each stack.

In accordance with another aspect of the present invention, the U-shaped collars are provided with laterally extending flanges for engaging portions of a container wall surrounding an aperture in the wall into which the collar has been fitted. A sealant applied to the flanges and the wall seals the collar in the aperture.

DETAILED DESCRIPTION OF THE INVENTION

The invention may better be understood by reference to the following detailed description of certain specific embodiments thereof which is given hereafter in conjunction with the several figures in which:

FIG. 1 is a perspective view of a cell element having aligned, abutting U-shaped, plate-lug collars in accordance with the present invention;

FIG. 2 is a section in the direction 2—2 of FIG. 1;

FIG. 3 is a section taken in the direction 3—3 of FIG. 1;

FIG. 4 illustrates one method of assembling a battery element having plate-lug collars in accordance with the present invention;

FIG. 6 is a perspective view of a portion of the battery container of FIG. 5 having cell elements made in accordance with the present invention inserted therein;

FIG. 8 is a perspective view of another method of assembling a battery cell having plate-lug collars in accordance with the present invention;

FIG. 9 is a perspective view of the battery cell after assembly according to the technique illustrated in FIG. 8; and FIG. 10 is a perspective view of a portion of a battery assembled in accordance with another embodiment of the present invention.

Figure 7:
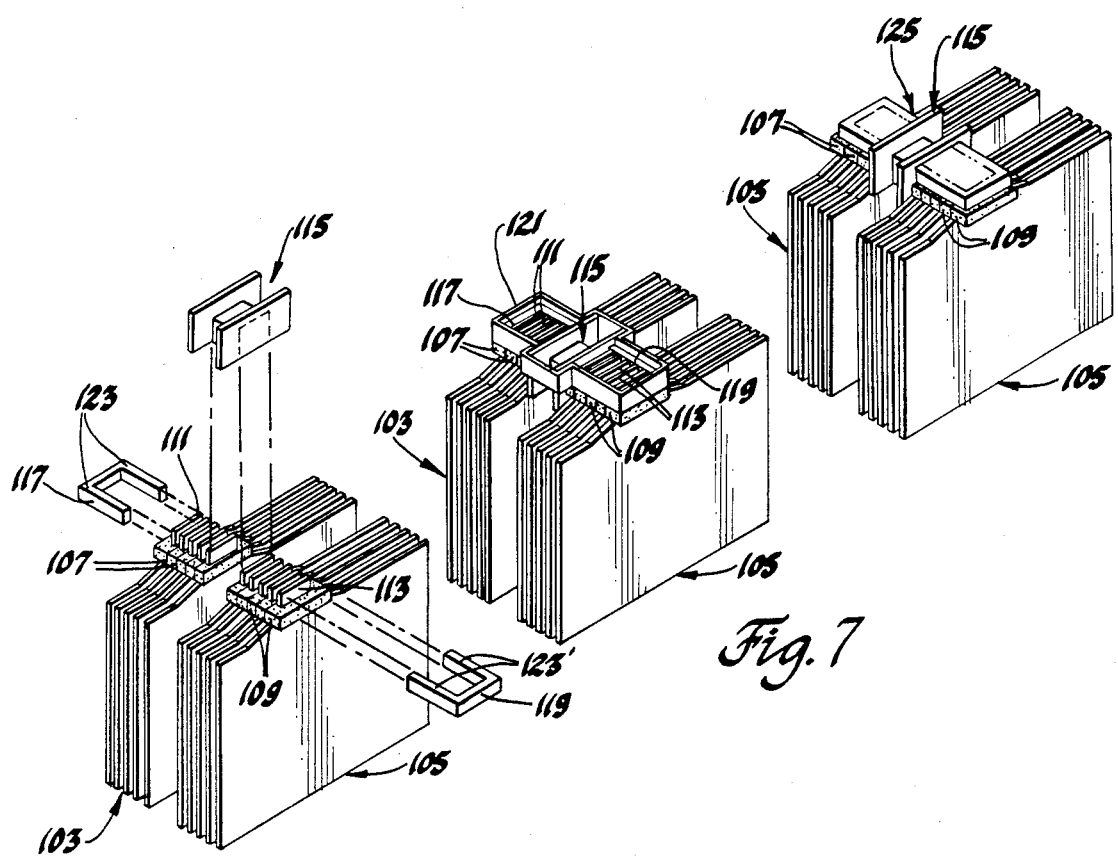
FIG. 7 illustrates another method of assembling a battery cell element having plate-lug collars in accordance with the present invention.

FIG. 1 depicts a battery cell element 1 comprising a stack of positive plates 3 interleaved with a plurality of negative plates 5 and appropriate interplate separators (not shown). The plates comprise an active material 7 supported on a conductive substrate, here shown as a gridwork of wires 9 joined at the top by a header 11. A plate lug 13 projects from each positive plate 3 and is aligned with other positive plate lugs along one side (e.g., the top) of the cell element stack 1. The negative polarity plates 5 have similar plate lugs 15 thereon similarly aligned. A U-shaped insulating collar 17 is firmly secured to the root (i.e., adjacent the header 11) of each positive plate lug 13 and is aligned in abutting relation with similar collars on the aligned lugs 13. Similar collars 19 on the negative lugs 15 are similarly aligned. While the following description is given in conjunction with the positive plates and their associated lugs and collars, it is to be understood that the substantial content thereof applies equally to the negative plates and associated lugs/collars. The collars space the aligned lugs from each other and preferably comprise a thermoplastic material (e.g., polypropylene, polyphenylene sulfide, or the like) injection molded directly about the lugs. The collars 17 preferably have a U-shaped configuration including a base portion 21 engaging the root 23 of each lug and upstanding legs 25 which flank the lateral edges 27 of the distal portions 29 of the lugs which are more remote from the active material 7 of the plate. The U-shaped collars 17, when aligned with similar collars, form a trough 31 for receiving an appropriate coupler, e.g., cast-in-place plate strap (not shown), for electrically joining the distal portions 29 of the several lugs together. In the case of a cast-in-place plate strap, the trough 31 serves as a mold to shape the molten lead cast therein. End plates 33 are provided at the ends of each trough 31 opposite the end where the intercell connector is to be formed and serve to prevent molten lead from spilling out of the end of the trough 31.

Each plate lug collar 17 and end plate 33 has an aperture 35 (i.e., about 0.065 inch diameter) formed therethrough to facilitate tying the several aligned lugs together in the stack. In this regard, when the several collars 17 are aligned, the apertures 35 line up as best shown in FIGS. 2 and 3. A thread 37 (e.g., 0.063 diameter polypropylene) is inserted through the several apertures 35 and has its ends 39 and 41 heat staked (e.g., headed over by a hot knife) to the end collar/end plate to tie the several collars 17 tightly together.

Figure 5:
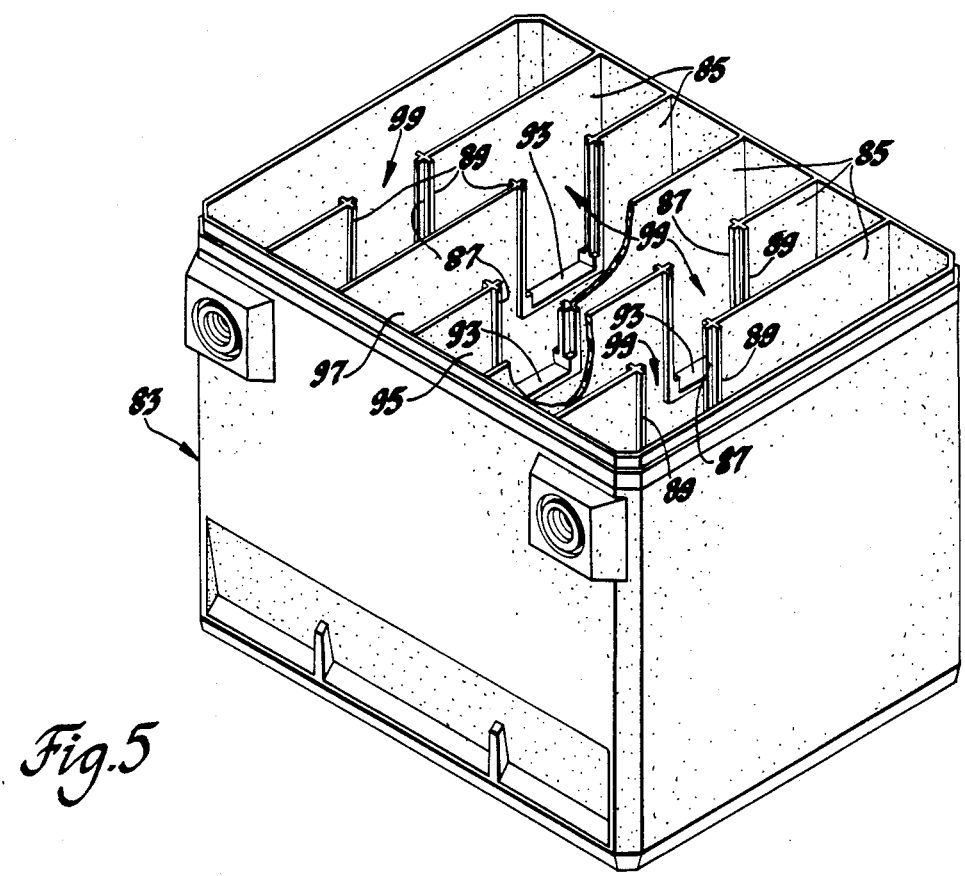
FIG. 5 is a perspective view of a battery container adapted to receive cell elements assembled as indicated in FIGS. 4 or 7.

FIG. 4 depicts another method of assembling a Pb-acid battery utilizing plate-lug collars in accordance with the present invention. According to this method, a plurality of positive plates 43 are stacked together (i.e., interleaved with negative plates, not shown) to form one cell element stack 45. Similarly, a plurality of negative plates 47 are stacked together (i.e., interleaved with positive plates, not shown) to form another cell element 49. The two cell elements 45 and 49 are destined for placement in adjacent cell compartments of a battery container after being electrically joined together via an intercell connector insert 51. The lugs 53 of the positive plates 43 of stack 45 have polypropylene collars 55 injection molded about the roots 57 thereof leaving the distal portions 59 thereof disposed above the collars 55 for electrical coupling to each other by an appropriate means (e.g., plate strap). Similarly, a plurality of negative plates 47 have their lugs 61 provided with collars 63 and are stacked together (i.e., interleaved with positive plates, not shown) to form the cell element stack 49. The cell elements 45 and 49 are positioned in an appropriate fixture or jig (not shown) so that the positive plate lugs 53 of element 45, the negative plate lugs 61 of element 49 and the intercell connector insert 51 are positioned as shown. The intercell connector insert 51 comprises an intercell connector element 65 which bridges an intercell partition of the container and flanges 67 and 69 on the opposite ends of the element 65. A steel mold 71 is then placed over the aligned lugs and insert. The mold 71 has a first molding cavity 73 encompassing the distal ends 75 of the negative plate lugs 61 and a second molding cavity 77 encompassing the distal ends 59 of the positive plate lugs 53 at the same time. The aligned and abutting lug collars 55, 63 form the bottoms of the mold cavities 73 and 77. Molten lead introduced into the mold cavities 73, 77 melts and fuses to the distal portions 75 and 59 of the lugs 61 and 53, respectively, as well as to the outer faces of the flanges 67 and 69 of the insert 51. The molten lead essentially solidifies into plate straps 79 and 81 and joins the lugs and insert together in a unified assembly which is ready for insertion into an appropriate battery container 83 (see FIG. 5).

The assembly formed as described in conjunction with FIG. 4 is inserted into a battery container 83 which includes a plurality of intercell partitions 85 for separating the several cell compartments one from the other. Each partition 85 includes a slot 87 adapted to receive the intercell connector element 65 in the manner shown in FIG. 6. Ribs 89 are provided on the partition 85 adjacent the slot 87 and serve to engage the inside faces 91 of the flanges 67 and 69 of the intercell connector insert 51. The lower ends of the ribs 89 engage a shelf 93 formed (i.e., in a second molding operation) at the bottom of the slot 87 and together therewith define a cavity 99. During assembly, the cell elements 45 and 49 are positioned in adjacent cell compartments 95 and 97 of the container 83 such that the inside faces 91 of the insert 51 engage the ribs 89 and shelf 93 to enclose the sides of the cavity 99. Thereafter an injection molding mold (not shown) is positioned over the partition 85 so as to encompass the slot 87 and flanges 67 and 69. Thermoplastic container material (e.g., polypropylene) is then injected into the mold so as: to fill the cavity 99; seal the connector element 65 in the slot and envelop the peripheral edges 101 of the flanges 67 and 69; and fill the remainder of the slot 87 above the cavity 99 to the top of the partition 85.

FIG. 7 depicts another similar method of assembling a battery utilizing the lug collars of the present invention. Cell elements 103 and 105 have plastic collars 107 and 109 molded about the roots of their respective plate lugs 111 and 113. The lugs sets are aligned with an intercell connector insert 115 in the same manner as described in conjunction with FIG. 4. In this embodiment, however, U-shaped pieces 117 and 119 of lead-coated copper are positioned about the lugs 111 and 113. Thereafter a steel mold 121 is positioned about the pieces 117, 119 and insert 115. Molten lead is then introduced between the legs 123 and 123' of the U-shaped pieces 117 and 119 to join the insert 115, plate lugs 111 and 113 and U-shaped pieces 117 and 119 together into a single unit 125. Thereafter the mold 121 is removed and the cell elements 103 and 105 positioned in a battery container in the manner as described in conjunction with FIG. 6.

Another application of plate-lug collars in accordance with the present invention involves forming the battery's interplate and/or intercell connectors and/or terminals on the outside of the battery container such as, for example, as shown in FIGS. 8 and 9. A battery cell element 126 is formed by interleaving a plurality of negative plates 127 with a plurality of positive plates 129 and intercell separators 131 essentially as described above. In the particular form shown, each negative plate 127 and positive plate 129 will have two lugs 133 and 135, respectively, for more efficient conduction of current to and from the plate. Individual insulating collars 137 are molded about each negative plate lug 133. Similarly, individual insulating collars 139 are molded about the positive plate lugs 135. Each collars 137 and 139 has a generally U-shaped configuration including a base portion 141, legs 143 and two sets A and B of flanges 145—145' and 147—147' which extend laterally outwardly from the legs 143. The flange sets A and B define therebetween openings 149 and 151 which mate with a portion of the exterior wall of a battery container as will be described in more detail hereinafter. A battery container comprises a plurality of discrete trays 153 which nest one within the other. The trays 153 each include slots 155 and 157 in the external walls 159 thereof for receiving the lug collars 137 and 139, respectively, as depicted. The flanges of the flange sets A and B embrace the portions of the container wall 159 forming the edges of the slots 155 and 157 which are snugly received in the openings 149 and 151 between the flanges. When so positioned, the collars 137 and 139 fill and substantially plug the slots with which they are mated. Thereafter molten lead is cast about the lugs between the legs 143 of the aligned collars 137 and 139 to form plate straps 161 in essentially the same manner as discussed above. In some instances, the container tray 153 will be the end tray in a stack and hence house the end cell of the battery. In such instances, a battery terminal 163 may be provided as follows. In this regard, several of the legs 143 are removed from the center region 165 of the aligned collars. The ends of a Pb-coated copper strap 167 are fitted into the openings 165 in the center region and molten lead cast between the legs 143 of the aligned collars to fuse the ends of the strap 167 to the plate straps 161 at the time of their formation. A stud 169 projects from the strap 167 for attachment to external circuitry. After the molten lead has solidified, the region about the connections is enclosed within a mold and hot plastic 170 injected thereabout to seal the collars within their respective slots and otherwise to put the connection in plastic, as shown in phantom in FIG. 9.

FIG. 10 depicts a variation of the structure shown in FIG. 8 wherein a lug collar 171 includes a single pair of oppositely extending flanges 173 and 175 lying contiguous the container wall 177 and sealed thereto by plastic 179 molded thereabout.

While the invention has been described in terms of certain specific embodiments thereof it is not intended to be limited thereto but rather only to the extent set forth hereafter in the claims which follow.

The embodiments of the invention in which an exclusive property or privilege is claimed are defined as follows:

1. In a galvanic cell including a stack of positive and negative polarity, lug-bearing plates alternately interleaved with one another and means for electrically joining aligned plate lugs into sets of like polarity, the improvement comprising:

said lugs each having a root portion proximate said plate and a distal portion more remote from said plate and engaging said means;

a discrete, insulating collar tightly surrounding said root portion of each said lug; and the collars of said aligned lugs abutting one another so as to space said aligned lugs apart and to insulate said joining means from the plates of opposite polarity.

2. A cell according to claim 1 wherein said collars each have a generally U-shaped configuration and said aligned abutting collars together define a trough for molding said joining means.

3. A cell according to claim 1 including means for tying said collars together in said aligned abutting relationship.

4. A cell according to claim 3 wherein said collars each have at least one aperture formed therethrough in a direction substantially perpendicular to the plane of the lug, the aperture of each said collar being aligned with apertures of the other collars when aligned in said abutting relationship and together defining a passageway therethrough and said tying means comprises a thread extending the length of said passageway and secured at each end to the end collars in the stack.

5. A cell according to claim 4 wherein said thread comprises a thermoplastic material, the ends of which are, heat staked to said end collars.

6. In an electric storage battery comprising a container having a plurality of walls defining an enclosure for a galvanic cell, an aperture in at least one of said walls, a stack of positive and negative polarity, lug-bearing plates alternately interleaved with one another housed within said container, and means for electrically joining aligned plate lugs into sets of like polarity, the improvement comprising:

said lugs each having a root portion proximate said plate and a distal portion more remote from said plate and engaging said means;

a discrete, insulating collar tightly surrounding said root portion of each said lug;

the collars of said aligned lugs abutting one another within said aperture so as to space said aligned lugs apart and to substantially fill said aperture; and means bonding said abutting collars in substantially leak-proof fashion to said wall adjacent said aperture.

7. A battery according to claim 6 wherein each said collar has a generally U-shaped configuration having its legs extending along either side of the distal portion of its associated lug and together with said abutting collars defining a trough for molding said joining means.

8. A multi-cell electric storage battery comprising: a container having a plurality of walls defining a plurality of individual cell compartments; a galvanic cell housed within each said compartment, said cell comprising a stack of positive and negative polarity plates alternately interleaved one with the other; an aperture in at least one of said walls; a lug projecting from each of said plates and through said aperture, said lug being aligned with similar lugs projecting from like polarity plates of one said stack for electrically joining said like polarity plates to plates of opposite polarity in another said stack in the next adjacent cell compartment; a discrete, insulating collar tightly surrounding each said lug where it passes through said aperture, said collar abutting a similar collar on at least one of said aligned lugs so as to space said aligned lugs apart and substantially fill said aperture; and means bonding said abutting collars in substantially leak-proof fashion to a portion of said wall adjacent said aperture.

9. A battery according to claim 8 wherein each said collar includes tow sets of substantially parallel flanges, said sets extending in opposite directions from each other substantially normal to the lateral edges of the lug, the flanges of each said set defining therebetween an opening for receiving said portion.

10. An electrode plate for an electric storage battery comprising: a conductive substrate supporting an electrochemically active material thereon; a lug projecting from said substrate for electrically coupling said plate to other component(s) of said battery; and an insulating collar molded in situ about said lug and adapted to mate with an aperture in a wall of the battery's container, said collar including at least two flange portions each extending in opposite directions one from the other substantially normal to the lateral edges of said lug for sealing to such portion of said wall as defines said aperture.

11. An electrode according to claim 10 wherein said collar includes at least four of said flanges arranged in sets of two wherein the flanges of each set are substantially parallel to each other and define therebetween an opening for receiving said portions.

12. A multi-cell electric storage battery comprising: a container having a plurality of walls defining a plurality of individual cell compartments; a galvanic cell housed within each said compartment, said cell comprising a stack of positive and negative polarity plates alternately interleaved one with the other; an aperture in at least one of said walls; a lug projecting from each of said plates and through said aperture, said lug being aligned with similar lugs projecting from like polarity plates of one said stack for electrically joining said like polarity plates to a terminal of the battery; a discrete, insulating collar tightly surrounding each said lug where it passes through said aperture, said collar abutting a similar collar on at least one of said aligned lugs so as to space said aligned lugs apart and substantially fill said aperture; and means bonding said abutting collars in substantially leak-proof fashion to a portion of said wall adjacent said aperture.

* * * * *

UNITED STATES PATENT AND TRADEMARK OFFICE
CERTIFICATE OF CORRECTION

PATENT NO. : 4,683,180
DATED : July 28, 1987
INVENTOR(S) : James R. Bish et al

It is certified that error appears in the above-identified patent and that said Letters Patent is hereby corrected as shown below:

Column 8, claim 12, delete the claim in its entirety.

On the title page "12 Claims" should read -- 11 Claims ---.

Signed and Sealed this

Twenty-seventh Day of September, 1988

Attest:

DONALD J. QUIGG

*Attesting Officer*  *Commissioner of Patents and Trademarks*